(12) United States Patent
Svoldgaard et al.

(10) Patent No.: US 12,091,205 B2
(45) Date of Patent: Sep. 17, 2024

(54) SYSTEM FOR OPENING AND EMPTYING A BOX WITH A LID

(71) Applicant: MAREL SALMON A/S, Stovring (DK)

(72) Inventors: Peter Thisted Svoldgaard, Stovring (DK); Mads Aagaard Dahl, Bronderslev (DK); Rasmus Tom Reimers Norgaard, Auning (DK); Jens Skov Damgaard, Aalborg (DK)

(73) Assignee: MAREL SALMON A/S, Stovring (DK)

( * ) Notice: Subject to any disclaimer, the term of this patent is extended or adjusted under 35 U.S.C. 154(b) by 295 days.

(21) Appl. No.: 17/427,455

(22) PCT Filed: Feb. 5, 2020

(86) PCT No.: PCT/EP2020/052874
§ 371 (c)(1),
(2) Date: Jul. 30, 2021

(87) PCT Pub. No.: WO2020/161188
PCT Pub. Date: Aug. 13, 2020

(65) Prior Publication Data
US 2022/0111992 A1 Apr. 14, 2022

(30) Foreign Application Priority Data
Feb. 6, 2019 (EP) ..................................... 19155760

(51) Int. Cl.
*B65B 69/00* (2006.01)
*B25J 11/00* (2006.01)
(Continued)

(52) U.S. Cl.
CPC ....... *B65B 69/0041* (2013.01); *B25J 11/0045* (2013.01); *B25J 15/0071* (2013.01); *B25J 15/0616* (2013.01); *B65B 57/08* (2013.01)

(58) Field of Classification Search
CPC .. B65B 69/0041; B65B 57/08; B25J 11/0045; B25J 15/0071; B25J 15/0616
(Continued)

(56) References Cited

U.S. PATENT DOCUMENTS 4,117,646 A * 10/1978 James ................... B65B 7/2871
53/488
4,696,615 A * 9/1987 Ettischer .................. B65H 1/30
399/361
(Continued)

FOREIGN PATENT DOCUMENTS

DE     3320459 A1    12/1984
EP     0528772 A1    2/1993
(Continued)

OTHER PUBLICATIONS

International Search Report and Written Opinion from PCT Application No. PCT/EP2020/052874, May 12, 2020.
(Continued)

*Primary Examiner* — Dariush Seif
(74) *Attorney, Agent, or Firm* — Workman Nydegger

(57) ABSTRACT

A system for opening a box having a body part and a lid, and for removing one or more food items from the box, includes a first tool for attaching to the body part, and a second tool for attaching to a surface of the lid at one or more points of contact and applying at each of the one or more points of contact a force to the lid having a component in a direction normal to the surface at the point of contact. Each of the first tool and the second tool is powered. The first tool and the second tool are arranged for orienting and/or displacing the
(Continued)

lid concerning the body part to open the box with the lid, and moving and/or orienting the body part to remove the one or more food items from the box.

15 Claims, 6 Drawing Sheets

(51) Int. Cl.
 *B25J 15/00* (2006.01)
 *B25J 15/06* (2006.01)
 *B65B 57/08* (2006.01)
(58) Field of Classification Search
 USPC .............................................. 53/492
 See application file for complete search history.

(56) References Cited

U.S. PATENT DOCUMENTS

| | | | | |
|---|---|---|---|---|
| 5,515,664 | A * | 5/1996 | Tanaka | B65B 5/106 |
| | | | | 53/247 |
| 5,568,750 | A * | 10/1996 | Galen | B65B 43/38 |
| | | | | 53/382.1 |
| 5,907,946 | A * | 6/1999 | Oishi | G03B 42/045 |
| | | | | 414/412 |
| 8,538,579 | B2 | 9/2013 | Cottone et al. | |
| 9,827,677 | B1 * | 11/2017 | Gilbertson | B25J 9/046 |
| 9,827,678 | B1 * | 11/2017 | Gilbertson | A47L 11/4055 |
| 2009/0056285 | A1 * | 3/2009 | Kramer | G01N 35/04 |
| | | | | 53/492 |
| 2010/0272547 | A1 * | 10/2010 | Cottone | B65G 61/00 |
| | | | | 700/214 |
| 2013/0125517 | A1 | 5/2013 | Gomi | |
| 2014/0054361 | A1 * | 2/2014 | Derby | B65D 5/2052 |
| | | | | 53/235 |
| 2015/0166249 | A1 * | 6/2015 | McDonald | A47F 1/126 |
| | | | | 206/758 |
| 2017/0036798 | A1 * | 2/2017 | Prahlad | B65B 59/00 |
| 2017/0050393 | A1 * | 2/2017 | Duclos | B29C 70/44 |
| 2019/0023503 | A1 * | 1/2019 | Tanoue | B65G 59/063 |
| 2019/0261565 | A1 * | 8/2019 | Robertson | A01D 46/253 |
| 2020/0122870 | A1 * | 4/2020 | Wapinsky | B65B 43/52 |
| 2020/0307140 | A1 * | 10/2020 | De Boer | B31B 50/0044 |
| 2020/0375388 | A1 * | 12/2020 | MacFarlane | G06Q 20/3224 |
| 2021/0107750 | A1 * | 4/2021 | Iino | B25J 19/023 |

FOREIGN PATENT DOCUMENTS

| | | |
|---|---|---|
| EP | 1095861 A1 | 5/2001 |
| EP | 2412254 A1 | 2/2012 |
| EP | 2548705 A1 | 1/2013 |
| EP | 2732926 A1 | 5/2014 |
| JP | S59152132 A | 8/1984 |
| JP | H04154527 A | 5/1992 |
| JP | H05254525 A | 10/1993 |
| JP | H6037208 A | 2/1994 |
| JP | H6056037 A | 3/1994 |
| JP | 2003081230 A | 3/2003 |
| JP | 2008001431 A | 1/2008 |
| JP | 2013100118 A | 5/2013 |
| WO | 2008151613 A1 | 12/2008 |
| WO | 2017048137 A1 | 3/2017 |

OTHER PUBLICATIONS

Extended Search Report from corresponding EP Application No. EP19155760.2, Jul. 1, 2019.
Japanese Office Action from Corresponding Japanese Patent Application No. JP2021-539018, Sep. 26, 2023.
Japanese Office Action from corresponding JP Application No. 2021-539018, Feb. 20, 2024.

* cited by examiner

SYSTEM FOR OPENING AND EMPTYING A BOX WITH A LID

FIELD OF THE DISCLOSURE

The invention relates to a system for handling a box, and more particularly for opening and emptying a box, and a corresponding use and method.

BACKGROUND

In fish processing plants, handling of boxes, and in particular opening and emptying of boxes, such as boxes of polystyrene foam comprising fish and ice, are typically handled manually. Manual handling is laborious, e.g., due to the large number of boxes and the significant weight of each box. Automation is challenging, e.g., due to the fragile character of the boxes and/or the requirements of fast handling.

Hence, an improved system, use and method for handling of boxes would be advantageous, and in particular a system, use and method, which mitigates or overcomes some or all of the problems mentioned above.

SUMMARY

It may be seen as an object of the present invention to provide a system and method, which overcomes the problems mentioned above. Thus, the above described object and several other objects are intended to be obtained in a first aspect of the invention by providing a system arranged for opening a box having a body part and a lid, the system furthermore being arranged for removing one or more food items from said box, said system comprising:

At least one first tool comprising an actuator, such as a first mechanically actuated tool, and for attaching to the body part, At least one second tool comprising an actuator, such as a second mechanically actuated tool, and for
  i) Attaching to a surface of the lid, such as exclusively to the surface of the lid, at one or more points of contact, and
  ii) Applying at each of the one or more points of contact a force to the lid, such as a pulling force, having a component in a direction normal to the surface at the point of contact, and wherein the first tool and the second tool are arranged for orienting and/or displacing the lid with respect to the body part so as to open the box with the lid, and moving and/or orienting the body part to remove the one or more food items from said box, such as orienting the body part to allow gravity to remove the one or more food items from said box.

The invention may be seen as particularly, but not exclusively, advantageous for obtaining a system, which via the first powered tool and the second powered tool reduces or eliminates the necessity of manual labour during opening and emptying of boxes, such as boxes with one or more food items.

Another possible advantage is that by attaching to the lid at one or more contact points, wherein the force applied at each contact point having a component in a direction normal to the surface at the point of contact, it becomes possible to attach to a position on a top surface of the lid (such as where the top surface is the outer surface of the lid opposite the cavity of the box), and pull up the lid via the applied force or forces. This may in turn simplify procedures, because it dispenses with a need to locate more specific details of the lid, such as the exact position of sides, edges and/or handles. Since an area of a (horizontal) top surface is typically larger than an area of a (vertical) side of the lid, it can make the process faster, because the relatively large top surface can quickly be identified, and the large area makes the process robust against (small) deviations in position of the one or more contact points, which in turn allows time consuming precision requirements to be dispensed with.

'Normal' to the surface is understood to be 'perpendicular' to the surface at the point of contact. It is understood, that for a force to have a component being normal to the surface, the force at that point of contact has to be directed away from the surface, although it need not be parallel with a normal vector. A smallest angle between the force and the normal vector can be within 0-90°, such as within 0-60°, such as within 0-45°, such as within 0-30°, such as substantially 0°, such as 0°.

The one or more points of contact may be at an outer surface of the lid, such as when the box is closed said surface is an outer surface of the lid opposite the cavity of the box. The one or more points of contact may be exclusively at one side, such as one surface, of the box. The second tool may approach the lid from one direction only.

By 'orienting and/or displacing the lid with respect to the body part so as to open the box with the lid' is meant the lid itself may be moved away from the body part when the first and second tool has engaged with the body part and the lid, though it may also mean the lid is held in a stationary position and only the body part is moved away from the lid. Hereby the lid may be held in a substantially horizontally position during the handling of the body part to emptying the body part.

The body part and/or the lid, such as each of the body part and the lid, may comprise, such as consist of, a material, such as a light-weight material, with a density of less than 100 kg/m$^3$, such as less than 50 kg/m$^3$, such as less than 25 kg/m$^3$. "Box" may be understood as a box (such as each of the body part and the lid) comprising, such as consisting of, extruded polystyrene foam (EPS). The box with contents (before being emptied) may have a mass exceeding 1 kg, 5 kg, 10 kg or 20 kg, such as a mass being within 20-40 kg, such as within 22-27 kg. A size (length) of each of the box and/or the lid along its largest dimension may be at least 50 cm, such as within 50-100 cm. The lid, such as the accessible portion of the lid when the box is closed, may be a substantially rectangular hexahedron, where each of two sides are larger, such as significantly larger, such as at least 1.1, 1.5, 2, 5 or 10 times larger than each of the remaining four sides.

Boxes and lids handled by the system are preferably of the type where the box and the lid are two separate units, which when the objects to be packaged are entered into a box, a lid is placed on the top of the box, and the lid may be held in positon by encircling four sides of the box e.g. with one or more straps, usually two straps. Preferable both boxes and lids are made of a soft plastic material such as polystyrene. When possible straps around a box are removed from the closed box, opening of such boxes requires no need of cutting into the lid or into the box.

Each of the first tool and the second tools may be powered, such as electrically powered. By 'actuator', such as a hydraulic, pneumatic and/or electric actuator, may be understood as a component responsible for moving and controlling a part of a tool. The first tool and the second tool may be mounted on a common element, such as a common tool, such as a common industrial robot. The first and the second tool may cooperate with the common tool, for example, the first tool may be arranged for moving the body part by gripping the body part and being moved with the body part by the common tool, in which case it is still understood that the first tool moves the body part.

The one or more food items removed from the box may include food items originating from or being plants or animals, such as consisting of vegetables, berries, fish (such as wherein fish may by salmon) or meat (such as wherein is meat may be any one of poultry, cattle or swine). The food items may be fresh or frozen, or cooled by ice such as fish with ice.

According to an embodiment, there is presented a system for opening a box, wherein the system is arranged for simultaneously opening (such as attaching to, opening and moving) a plurality of boxes, such as two boxes. When handling two boxes one box at a time may be picked up by the system. An advantage of handling two boxes at a time may be that capacity is increased.

According to an embodiment, there is presented a system for opening a box wherein said one or more points of contact when attaching the second tool to a surface of the lid are placed away from an edge of said surface, such as at least 1 mm away, such as at least 5 mm away, such as at least 10 mm away, such as at least 20 mm away, such as at least 50 mm away, such as at least 100 mm away from an (any) edge of said surface. A possible advantage is that it enables utilizing a part of the surface, such as the top surface, away from the edge, which in turn allows dispensing with a need to locate the exact position of the edge during attachment to the lid and opening of the box. For example, for a process relying on the edge of the lid, it requires time to find the edge of the lid, but a process contacting to a point of contact at a surface away from the edge needs less time, because it merely needs to find the (larger) surface. In other words, the second tool can attach at a position of the surface spaced apart from any edge of the surface, which may yield a large area to aim for, which in turn makes the attachment robust against misalignments/lack of precision (for example in the low cm range for boxes with lengths and widths exceeding 10 cm). By 'away from an edge of said surface' may be understood as away from any edge of said surface.

According to an embodiment, there is presented a system for opening a box wherein the second tool comprises one or more elements, such as needles, arranged for penetrating the lid during attachment to the lid, such as penetrating and entering at least 1 mm, such as at least 2 mm, such as at least 5 mm, such as at least 10 mm, such as at least 20 mm, such as at least 50 mm, into the lid. A possible advantage is that the elements for penetrating the lid may facilitate applying a force to the lid with a component normal to the surface. Another possible advantage may be that the one or more elements can be made robust against dirt and moisture. The elements may be one or more needles, such as needles with or without barbs.

According to an embodiment, there is presented a system for opening a box wherein the second tool comprises one or more elements, such as one or more suction cups, arranged for creating a partial vacuum between the one or more elements and the lid during attachment to the lid. A possible advantage is that the elements for creating a partial vacuum may facilitate applying a force to the lid with a component normal to the surface. Another possible advantage may be that the box may be opened without damaging the lid.

According to an embodiment, there is presented a system for opening a box wherein the first tool is further arranged for moving the body part horizontally or sideways which may also include some vertical movement, such as moving the body part to a position above a receiving area, such as a de-icing area or a receptacle or a receiving bin or a content receiving conveyor. A possible advantage is that the first tool may double function for both aiding in opening the box and for moving the body part. Furthermore, a more efficient process may be achieved because the same period of time may be utilized for opening the box and moving at least the body part.

According to an embodiment, there is presented a system for opening a box with a lid wherein moving and/or orienting the body part so as to remove the one or more food items from said box, comprises orienting the body part to allow gravity to remove the one or more food items from said box. A possible advantage is that it is an efficient way of removing the one or more food items, since gravity is exploited for applying a force to the one or more food items and doing some or all of the work in removing the one or more items from the body part. The 'orienting of the body part to allow gravity' may include turning the box upside down, such as rotating it around a non-vertical axis, such as rotating at around a horizontal axis, such as rotating it at least 90°, such as at least 120°, such as at least 135°.

According to an embodiment, there is presented a system for opening a box wherein the one or more elements for attaching the second tool to the lid comprise a plurality of elements, such as at least 2, 4, 8 or 16 elements. A possible advantage of this may be that in the case of a plurality of elements, less force has to be exerted by each element for moving and/or re-orienting the lid. According to an embodiment, there is presented a system for opening a box wherein the plurality of elements are arranged for penetrating the lid at different angles with respect to each other. A possible advantage is that it facilitates that the lid is less likely to slide off the elements. 'Different angles' may be understood as an angle of at least 1°, such as at least 10°, such as within 10°-80°, such as within 15-75°, such as 60°.

According to an embodiment, a direction of displacement of the lid, such as immediately after opening of the box, makes a non-zero angle with each element, such as an angle of at least 1°, such as at least 10°, such as within 10°-80°, such as within 15-75°, such as 30°.

To secure a good holding of the lid of a box the at least one second tool engaging with one lid of a box may be e.g. 2, 3, 4, 5, 6, 7, 8, 9, 10 tools. Preferred is 4-8 second tools for engaging with a lid of a box.

According to an embodiment, there is presented a system for opening a box wherein the first tool is arranged for— optionally repeatedly—applying a force to the body part accelerating and/or decelerating it, such as said force applied to the body part having a vertical component, such as during a period wherein the body part of the box is oriented so as to allow gravity to remove the one or more food items from said box. A possible advantage is that it enables the system to shake out contents of the box, such as contents which initially adhere to the body part.

According to an embodiment, there is presented a system for opening a box, wherein the body part and/or the lid, such as each of the body part and the lid, comprises, such as consists of, a material with a density of less than 100 kg/m$^3$, such as less than 50 kg/m$^3$, such as less than 25 kg/m$^3$, such as polystyrene foam, such as extruded polystyrene foam (EPS).

According to an embodiment, there is presented a system for opening a box wherein the first tool and the second tool are furthermore arranged for orienting and/or displacing the lid with respect to the body part so as to close the box with the lid, such as to save space.

The first tool and the second tool are preferably simultaneously in contact with the body part and the lid, respectively, at least during moving and/or orienting of the body part so as to remove the one or more food items from the box. Preferably the lid is located on the box again after the food items have been removed from the box.

Moving and/or orienting the body part to remove the one or more food items from the box preferably means the body part is emptied substantially without damaging the box, except for the perforations which may arrive due to the engagement by the first and second tool.

According to an embodiment, there is presented a system for opening a box wherein
  The first tool is arranged for releasing the body part, and
  The second tool is arranged for releasing the lid.

"Releasing" may include withdrawing one or more elements, which have previously penetrated the lid and/or the body part and/or may include releasing a partial vacuum between the one or more elements and the lid and/or the body part.

According to an embodiment, there is presented a system for opening a box wherein the system is further comprising a means for moving, such as a conveyor for conveying, the box to the first tool and/or to the second tool. According to an embodiment, there is presented a system for opening a box wherein the means for moving is further arranged for moving a pallet with one or more boxes placed on the pallet. According to an embodiment, there is presented a system for opening a box wherein the system is further comprising a means for moving, such as a conveyor for conveying, the box away from the first tool and the second tool.

According to an embodiment, there is presented a system for opening a box wherein the system is further comprising one or more sensors for detecting the box, such as a detecting position (such as position in 1, 2 or 3 dimensions) and/or orientation (such as at least angular orientation around a vertical axis). A possible advantage is that the one or more sensors enable the first tool and/or the second tool to attach to the box, such as to the body part and the lid. The one or more sensors may detect merely a presence of a box, or may detect also position and/or orientation. The one or more sensors may for example detect three-dimensional position on a pallet and an orientation around a vertical axis.

According to an embodiment, there is presented a system for opening a box wherein the system is further comprising:
  A user input interface, such as a touch screen, for inputting information about one or more defect boxes and/or information about one or more boxes which should not have content removed,
  A processor arranged for
    i) receiving said information, and
    ii) controlling the first tool and/or the second tool based on said information.

A possible advantage may be that a user may provide additional information to the system. For example, in case a box is defect (which may often be the case with lightweight boxes made of polystyrene foam and carrying relatively heavy contents) a user may provide this information via the user input interface, and the processor of the system can take this information into account, e.g., by not attaching to and/or opening the box. This may in turn avoid that the box breaks during handling by the system, which could result in spilling of its content at unfortunate position. Alternatively, a user may provide information via the user input interface about one or more boxes, which should not have their content removed. The user input interface may comprise a screen, such as a touch-screen, presenting in graphical form an overview of boxes, which the system can open and remove the contents from, and where a user can input information about one or more specific boxes by selection.

The system may furthermore comprise at least one cutting device capable of cutting straps located around boxes. The at least one cutting device may be arranged to cut along the long distance of a lid, or to cut perpendicular to the location of one or more straps located around boxes. The cutting device may be arranged in a rail directing e.g. a knife from one end of a lid to another end of a lid to cut any straps. The cutting device may be located at the lid part, at the bottom part and/or at a side between the lid and bottom part. Preferably the cutting device is arranged to cut straps at the lid part.

When handling boxes with straps located around the boxes, the cutting device may be activated to cut straps in a period from when the at least one second tool engages with a lid and until at least one of the lid and the body part starts to be moved away from the other to orienting and/or opening the box.

According to a second aspect, there is presented use of a system according to the first aspect for opening a box with a lid, such as wherein
  The box comprises, such as consists of polystyrene, such a polystyrene foam, such as extruded polystyrene foam,
  The box comprises one or more food objects, such as fish, such as frozen fish, such as fresh fish cooled with ice.

According to a third aspect, there is presented a method for opening a box having a body part and a lid (the body part and/or the lid, such as each of the body part and the lid, comprises, such as consists of, a material with a density of less than 100 kg/m3, such as less than 50 kg/m3, such as less than 25 kg/m3, such as polystyrene foam, such as extruded polystyrene foam (EPS)), said method comprising:
  Attaching at least one first tool comprising an actuator (such as attaching the first tool by means of the actuator of the second tool), such as a first mechanically actuated tool, to the body part, and
  Attaching at least one second tool comprising an actuator (such as attaching the second tool by means of the actuator of the second tool), such as a second mechanically actuated tool, to a surface of the lid, such as exclusively to the surface of the lid, at one or more points of contact,
  such as wherein each of the first tool and the second tool are powered,
  and wherein the method is further comprising:
  Applying at each of the one or more points of contact a force to the lid, such as a pulling force, having a component in a direction normal to the surface at the point of contact,
  orienting and/or displacing the lid with respect to the body part so as to open the box with the lid, and
  moving and/or orienting the body part to remove the one or more food items from said box, such as orienting the body part and allowing gravity to remove the one or more food items from said box.

The method may comprise connecting the system to one, two or more boxes and simultaneously or substantially simultaneously
  orienting and/or displacing the lids with respect to the body parts so as to open the boxes with the lids, and
  moving and/or orienting the body parts to remove the one or more food items from said boxes, such as orienting the body parts and allowing gravity to remove the one or more food items from said boxes.

The method may further comprising locating the empty box or boxes onto a box outfeed conveyor.

According to an embodiment, there is presented a method wherein the body part and/or the lid, such as each of the body part and the lid, comprises, such as consists of, a material with a density of less than 100 kg/m$^3$, such as less than 50 kg/m$^3$, such as less than 25 kg/m$^3$, such as polystyrene foam, such as extruded polystyrene foam (EPS).

A fourth aspect of the invention relates to a system for opening a box wherein the system comprises:

At least one first tool configured to engage with a body part of a box,

At least one second tool configured to engage with a lid of a box,

Optionally a cutting device arranged to cut straps from a box when the box is engaged with the first tool and/or the second tool.

In embodiments of the fourth aspect preferred embodiments may be selected from and combined in any possibility (though embodiments described elsewhere herein may also be combined with the fourth aspect):

The second tool may engage with the lid of a box in any suitable manner. This may be as described elsewhere herein and/or by holding the lid such as by clamping around the edges of the lid e.g. edges along the long side of the lid and/or edges along the short side of the lid.

The second tool may be holding the lid in a stationary position which may be substantially horizontal while the body part is moved from a closed position to an open position where the body part is emptied.

The first tool or a frame and actuators connected to the first tool are moving the body part between a closed and an open position, where the body part may be emptied in the open position.

The cutting device may be arranged at the lid, at the bottom and/or at a side of the box.

The system may be constructed for handling one box or for handling two or more boxes.

The system may be connected to a robot arm.

Embodiments of the different aspect of the present invention may each be combined with any of the other aspects. These and other aspects of the invention will be apparent from and elucidated with reference to the embodiments described hereinafter.

BRIEF DESCRIPTION OF THE FIGURES

The system, use and method for opening a box having a body part and a lid and for removing one or more food items from said box according to the invention will now be described in more detail with regard to the accompanying figures. The figures show ways of implementing the present invention and are not to be construed as being limiting to other possible embodiments falling within the scope of the attached claim set.

FIGS. 2-3, including FIGS. 2(a)-3(b), show the first and second tool with needles shown before penetration of the lid.

FIG. 4, including

DETAILED DESCRIPTION OF EMBODIMENTS

Figure 1:
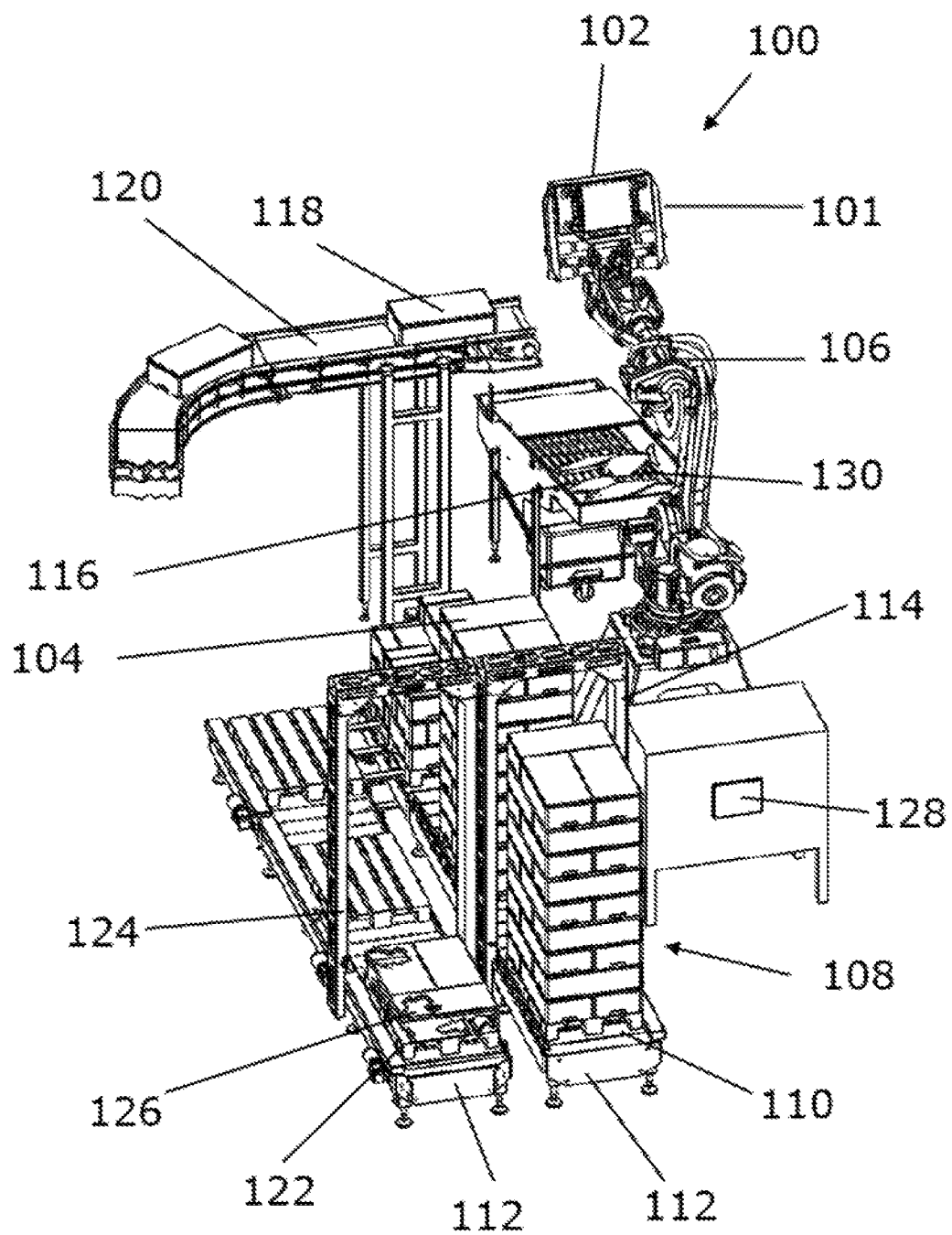
FIG. 1 shows a system arranged for opening an EPS box having a body part and a lid.

FIG. 1 shows a system 100 arranged for opening an EPS box 104 having a body part and a lid, the system furthermore being arranged for removing one or more food items, such as fish and ice of a total mass of approximately 22-27 kg, from said box. Said system comprises a first tool 101, being a gripper, comprising an actuator and being arranged for attaching to the body part, and a second tool 102 comprising an actuator and being arranged for attaching exclusively to the surface of the lid at one or more points of contact, and applying at each of the one or more points of contact a pulling force to the lid having a component in a direction normal to the surface at the point of contact. In the present embodiment, the second tool 102 approaches the lid from one direction only. Each of the first tool and the second tools is an electrically powered, mechanically actuated tool (such as by means of electric motors, pneumatics and/or hydraulics). The first tool and the second tool are furthermore arranged for orienting and/or displacing the lid with respect to the body part so as to open the box with the lid, and orienting the body part (e.g., by turning it upside down) so as to allow gravity to remove the one or more food items from said box. The figure furthermore shows a powered tool 106 whereupon both of the first tool 101 and the second tool 102 are mounted. The powered tool 106 is a robot, and more particularly an articulated, general purpose, industrial robot. Boxes 108 are generally arranged on pallets, such as pallet 110, which are moved to the first tool 101 and the second tool 102 by a pallet infeed conveyor 112, which conveys through an entry gate 114, whereupon two sensors are arranged for detecting an arrangement of boxes 108 on pallet 112, which arrangement is provided to a processor for controlling the robot 106 and the first tool 101 and the second tool 102. Furthermore, the two sensors are for security purposes arranged for detecting unwarranted entry through the entry gate 114. Once a box, such as box 104 is ready for emptying, the first tool 101 grips the body part, and the second tool 102 attaches to a surface of the lid at one or more points of contact and applies at each point of contact a pulling force to the lid having a component in a direction normal to the surface at the point of contact. Subsequently, the first tool 101 and the second tool 102 open the box by removing the lid from the body part, move at least the body part horizontally to bring it into a position above a receiving area 116 (showing fish having been emptied out of preceding box 118) and turn the body part upside down so as to allow gravity to remove the one or more food items from said box and onto a receiving area 116. Emptied boxes, such as box 118, are placed on a box outfeed conveyor 120. Emptied or partially emptied pallets, such as pallet 122 are removed by pallet outfeed conveyor 124. In the present embodiment, an exit gate 124 comprises a senor, which for security purposes is arranged for detecting unwarranted entry through the gate 124. The system is capable of attaching to, opening, emptying, closing and de-attaching from equal to or more than 4, such as 6, such as 8, such as 10, boxes per minute.

The figure furthermore shows a user input interface 128 being a touch screen for inputting information about one or more defect boxes and/or information about one or more boxes which should not have content removed. The system furthermore includes a processor (not shown) arranged for receiving said information and controlling the first tool and/or the second tool based on said information. For example, a user may receive on the touch screen 128 information about an arrangement of palletized boxes 108 going towards the first tool 101 and the second tool 102. If the user then observes that some boxes are defect (as was the case for box 126 on pallet 122) the user may then via user input interface 128 input information about the one or more defect boxes. The processor can then control the first tool 101 and the second tool 102 accordingly, for example by not emptying said defect box, which is advantageous for avoiding that said defect box breaks during opening and emptying and that its contents becomes emptied onto a wrong position, which may require cleaning and/or stopping of the system. Similarly, a user can input information about boxes not to be emptied for other reasons, e.g., that only a certain number of boxes should be emptied and the remaining palletized boxes should simply be returned unopened on pallet outfeed conveyor 112.

Figures 2A, 2B:
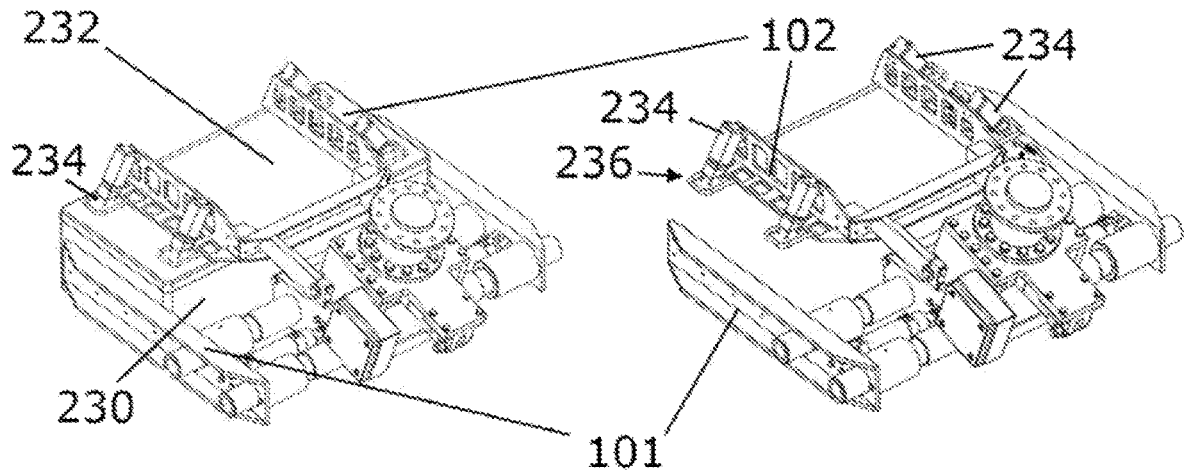

FIG. 2 shows the first tool 101 and the second tool 102. The figure shows the first tool 101 gripping around a body part 230 and second tool 102 being ready for attaching to a lid 232. More particularly, tool 102 comprises four cylinders, such as cylinder 234, for pushing needles 236 into the lid, but in the present figure the needles are shown before penetrating the lid. FIGS. 2(a) and 2(b) are similar, except FIG. 2(a) is shown with the body part 230 and lid 232 and FIG. 2(b) is shown with the body part and lid removed for clarity.

Figures 3A, 3B:
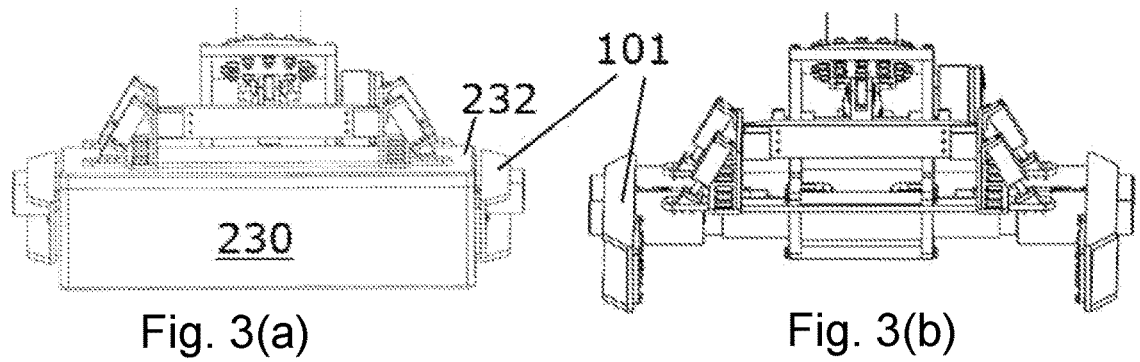

FIG. 3 shows the first tool and the second tool. FIG. 3(a) is similar to FIG. 2(a) except shown at a different angle. FIG. 3(b) is similar to FIG. 2(b) except shown at a different angle.

Figures 4A, 4B:
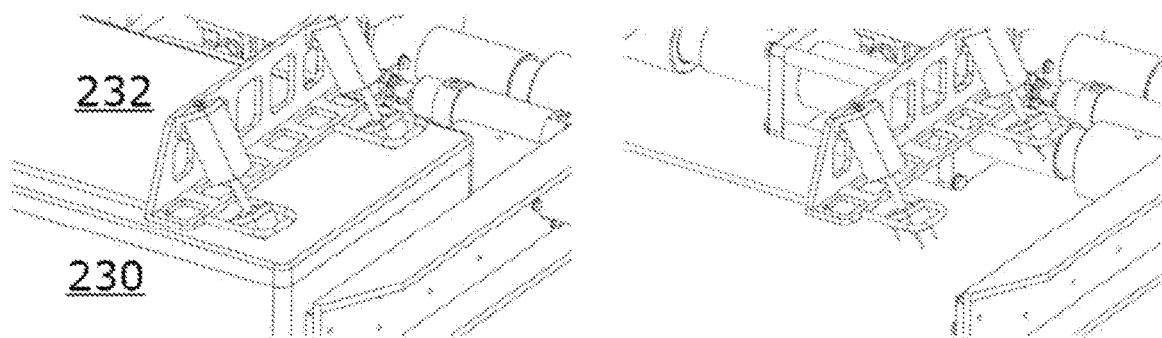
FIGS. 4(a) and 4(b), shows the first and second tool with needles shown after penetration of the lid.

FIG. 4 shows the first tool and the second tool. The figure shows in particular the first tool after actuation of the cylinder pushing to penetrate the lid. FIG. 4(a) is shown with the body part and lid (but with the needles not visible because they are pushed into the lid) and FIG. 4(b) is shown with the body part and lid removed for clarity.

Figure 5:
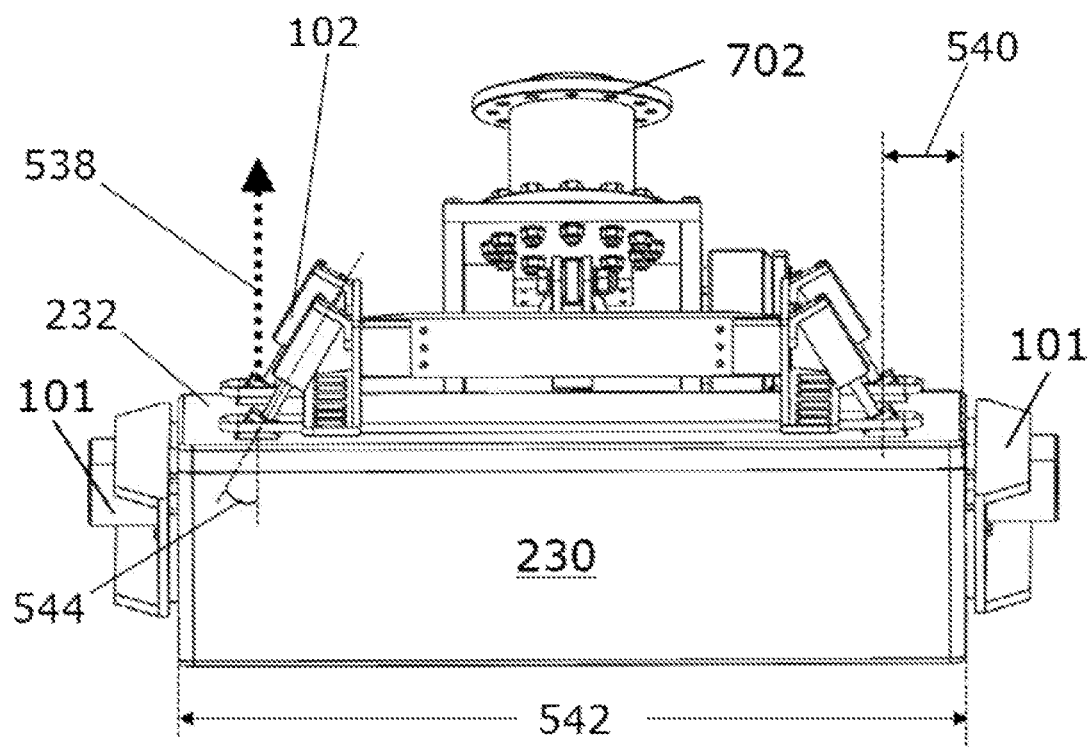
FIG. 5 shows the first and second tool and a force vector of a force applied to the lid.

FIG. 5 shows the first tool and the second tool. The figure also shows a force vector 538 of a force applied to the lid 232 at a point of contact between the second tool 102 and the lid 232, which force vector 538 is parallel with a vector normal (perpendicular to) the surface of the lid. The figure also shows the points of contact being placed away from an edge of said surface, and in particular shows a point of contact being placed a distance 540 of 50-100 mm, such as 50 mm, 75 mm or 100 mm away from an edge of said surface. The box has a largest dimension (length) 542 of 80 cm (the dimensions of the box may be given by a length× depth×height of 80 cm×40 cm×[20-25] cm, but boxes of sizes deviating therefrom are also conceivable, such as dimensions within 10-1000%, such as within 20-500%, such as within 50-200%). An angle 544 between a surface normal and a direction of the penetrating needles in one side (the left side in the figure) of the first tool is 30°. In the other side (the right side in the figure) the angle vs. the surface normal is −30°. The lid is opened (at least initially) in a direction of the force vector 538 being normal to the surface. Each needle thus makes an angle (30° or −30°) with an opening direction. Furthermore, the plurality of elements are arranged for penetrating the lid at different angles with respect to each other, and in the figure there is an angular difference within the plurality of angles of 60°. While an absolute angular difference with respect to the surface normal is 30° in the example, this angle could be any angle within 0°-90° (optionally combined with barbs), such as within 10°-80°, such as within 15°-75°, such as within 15°-45°, such as within 20°-40°.

Figure 6:
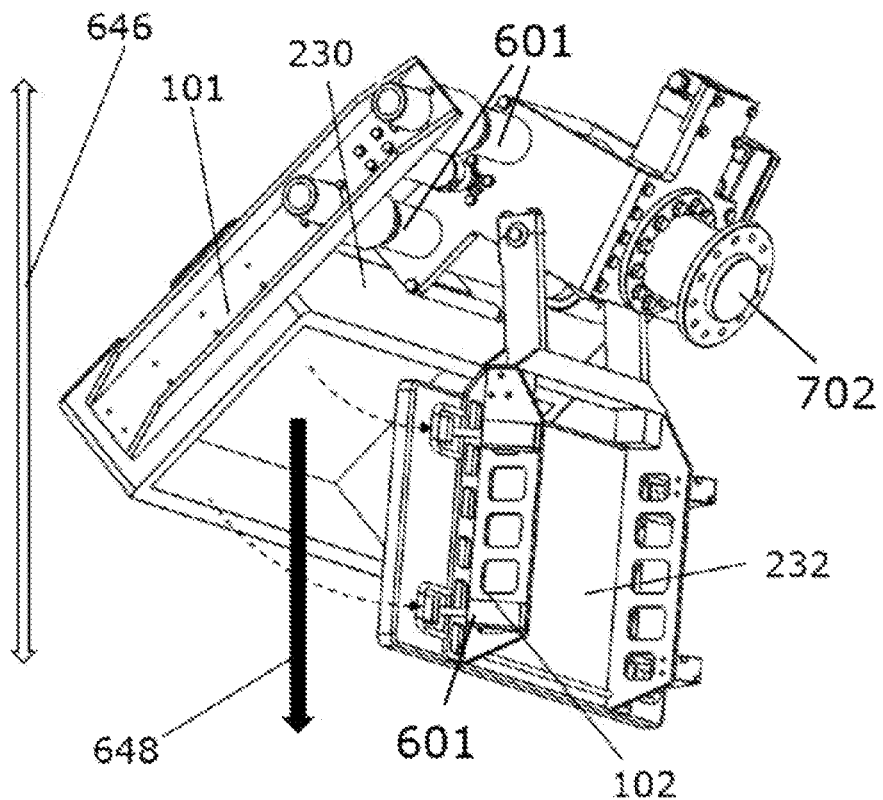
FIG. 6 shows the lid displaced with respect to the body part.

FIG. 6 shows that the first tool and the second tool have oriented and displaced the lid with respect to the body part (as indicated by the dashed arrows showing rotation of the lid around an axis) so as to open the box with the lid, and furthermore oriented the body part so as to allow gravity (as indicated by force vector 648) to remove the one or more food items from said box, i.e., turned the body part upside down to pour out the contents of fish and ice from the box. The system may be arranged for applying a force (as indicated by double headed arrow 646) to the body part accelerating and decelerating it where said force has a vertical component during a period wherein the body part of the box is oriented so as to allow gravity to remove the one or more food items from said box.

Figure 7:
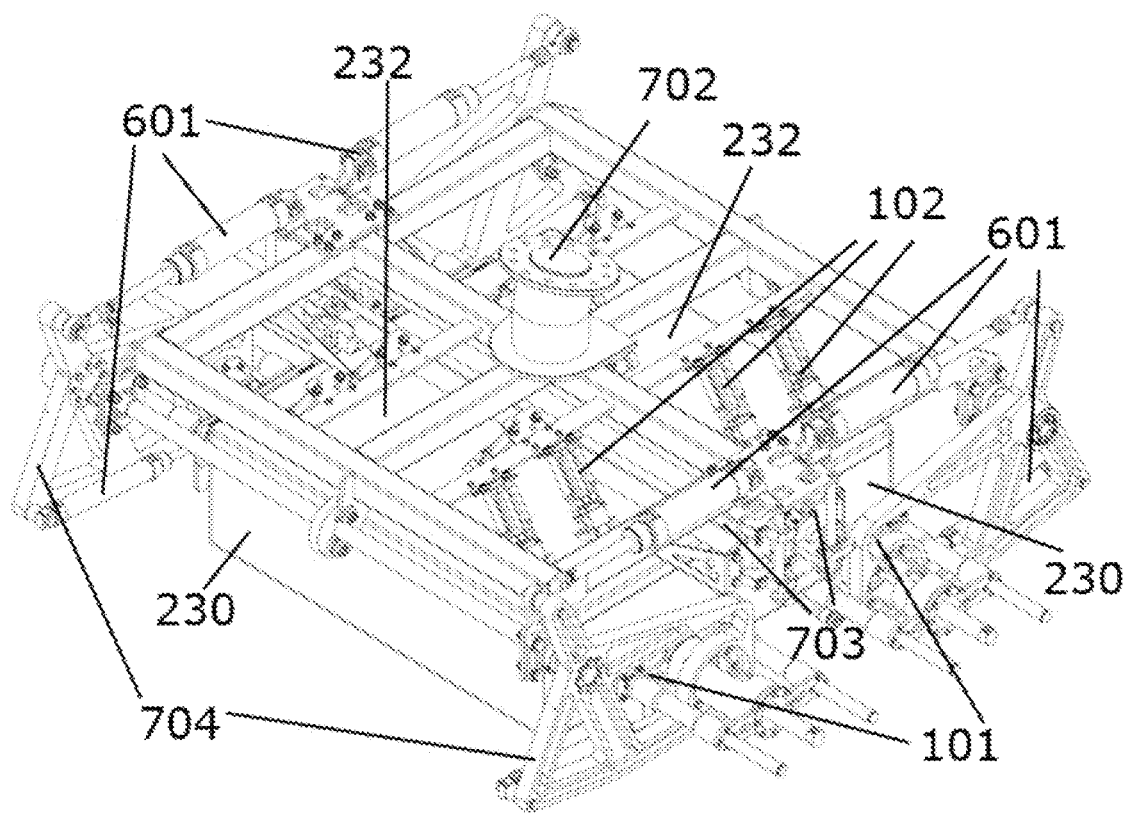
FIG. 7 shows a system configured for simultaneously opening two boxes. The system is in a closed position where it picks up boxes.

FIG. 7 shows a system configured for simultaneously opening two boxes. The system is in a position where it picks up boxes which is when a frame 704 holding the first tool 101 is in a closed position and makes the first tool 101 capable of connecting to each end of a body part 230 of a box. In this view two boxes are held by the system, where the body parts 230 are beneath the lids 232. First tools 101 grip at the ends of the body parts 230 and second tools 102 engage with the lids 232. Second tools 102 are illustrated in both ends of the lids 232. A flange 702 for connecting to a robot arm is illustrated. Acutators 601 are also illustrated. These actuators are for controlling the position of the frame 704 and thus the position of the body part 230, as is further illustrated in FIGS. 8-10. Cutting devices 703 are located along the top side of the lids 232, the cutting devices 703 are each configured to be capable of cutting along the outside of a lid of a closed box with straps around.

Figure 8:
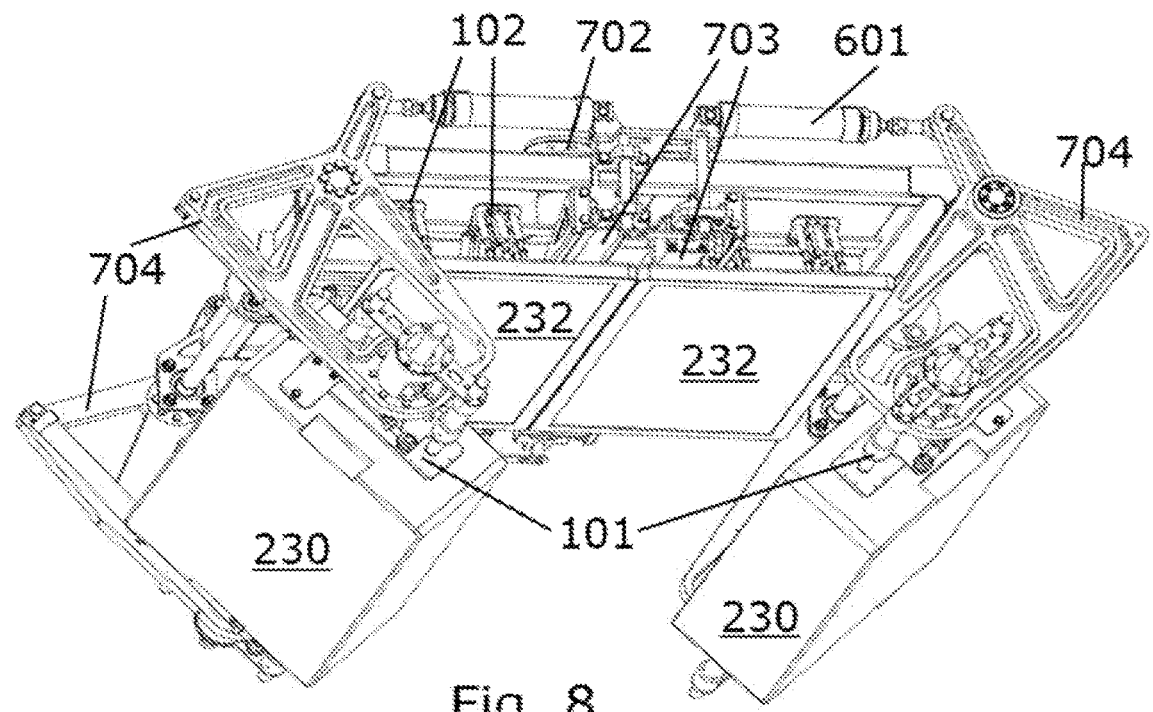
FIG. 8 shows the system capable of handling two boxes, where the system is in an open position and the boxes are opened.

FIG. 8 shows a system for the simultaneously opening of two boxes. The two boxes are each picked up by the system as illustrated in FIG. 7. The system is in an open position where actuators 601 have moved the frame 704 connected by first tools 101 to each of the body parts 230 such that the body parts 230 has been turned downwardly and outwardly in respect of the position shown in FIG. 7. The body parts 230 have their bottom in a mainly downward position such that objects in the body parts 230 may still be located in the body parts 230. Illustrated are also the cutting devices 703.

Figure 9:
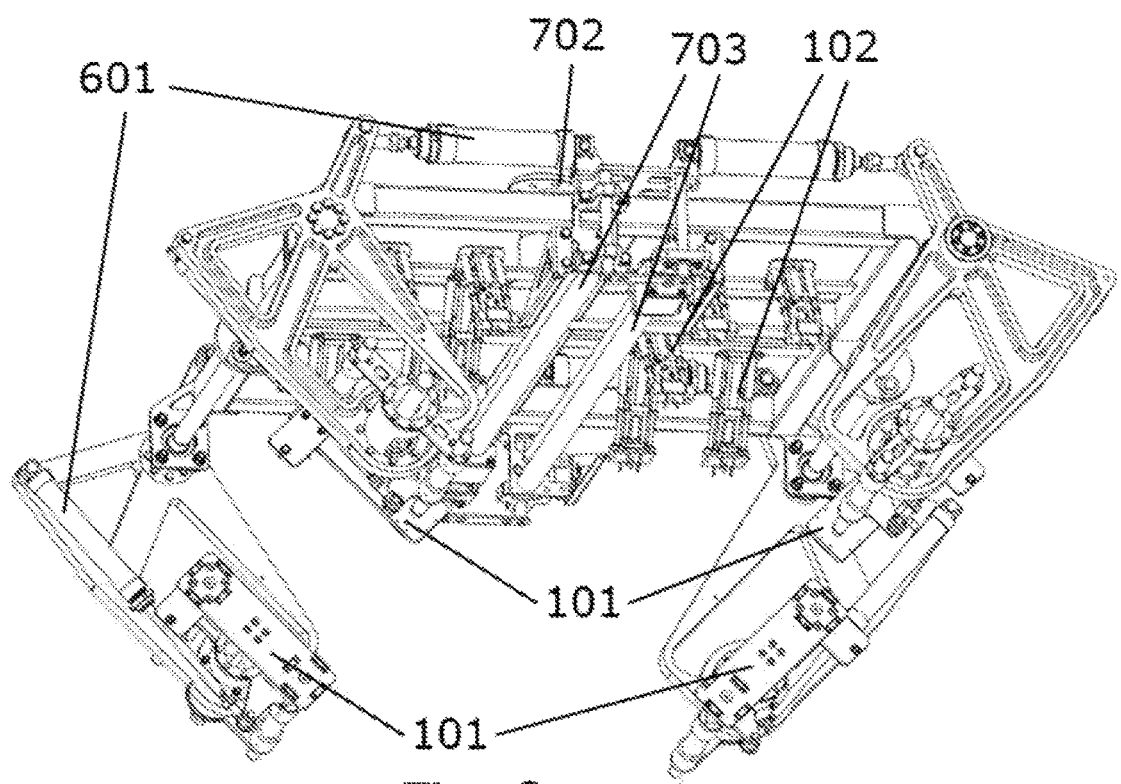
FIG. 9 shows the system capable of handling two boxes, though without boxes in the system.

FIG. 9 shows the system capable of handling two boxes in an open position. The system in this figure is similar to the system shown in FIG. 8, though the system is shown without the body part and lid of the two boxes.

Figure 10:
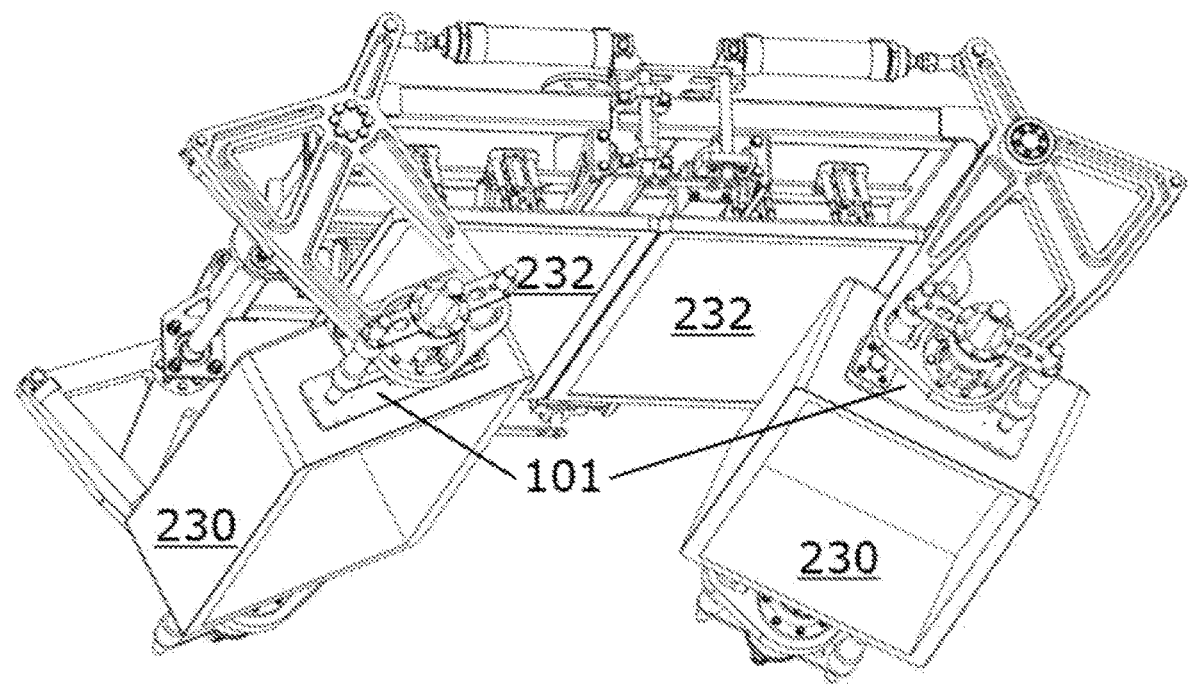
FIG. 10 shows a system for simultaneously opening and emptying of two boxes. The boxes are in a position to be emptied.

FIG. 10 shows a system for simultaneously opening and emptying of two boxes. The system is in an open positon as described in relation to FIG. 8. It is shown that the body barts 230 have been turned such that the bottom part is upside and objects in the body parts 230 would be disposed of due to gravity force. A turning mechanism is located in the first tools 101 capable of turning the body parts 230 to empty the body parts 230 and return the body parts 230 to their original position under the lids 232 where the body parts 230 have their bottom turned downwards. Afterwards the frame may return the body parts 230 to be located just below the lids 232.

Figure 11:
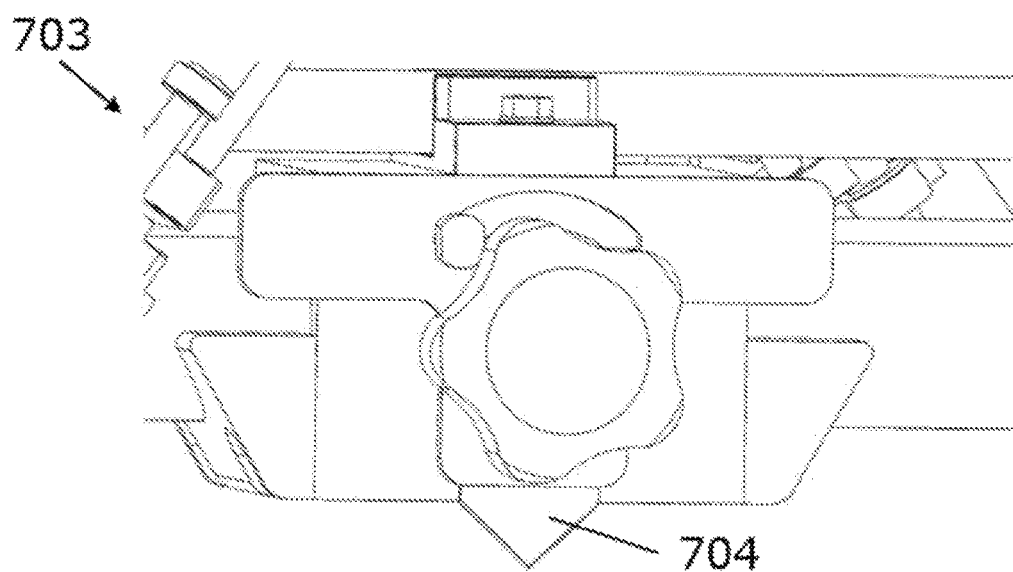
FIG. 11 shows a close view of a cutting device for cutting straps around a box.

FIG. 11 shows a close view of a knife 704 of a cutting device 703. As shown in FIG. 7-9 a cutting device 703 can be located in the system along each lid to cut straps located around the boxes. The cutting device can be directed along the length of a lid in a rail system hereby cutting straps around the box.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A system arranged for opening a box having a body part and a lid, the system being arranged for removing one or more food items from said box, said system comprising:
   a first tool comprising an actuator and for attaching to the body part; and
   a second tool comprising an actuator and for attaching to a surface of the lid at one or more points of contact, and applying at each of the one or more points of contact a force to the lid having a component in a direction normal to the surface at the point of contact;
   wherein the first tool and the second tool are arranged for orienting and/or displacing the lid with respect to the body part so as to open the box with the lid, and moving and/or orienting the body part so as to remove the one or more food items from said box by orienting the body part to allow gravity to remove the one or more food items from said box;
   wherein the body part and the lid are two separate units.

2. The system for opening a box according to claim 1, wherein said one or more points of contact are placed away from an edge of said surface.

3. The system for opening a box according to claim 1, wherein the second tool comprises one or more elements, including needles, arranged for penetrating the lid during attachment to the lid.

4. The system for opening a box according to claim 3, wherein the one or more elements comprise a plurality of elements, including at least 2, 4, 8 or 16 elements.

5. The system for opening a box according to claim 4, wherein the plurality of elements is arranged for penetrating the lid at different angles with respect to each other.

6. The system for opening a box according to claim 1, wherein the second tool comprises one or more elements, including one or more suction cups, arranged for creating a partial vacuum between the one or more elements and the lid during attaching to the lid.

7. The system for opening a box according to claim 1, wherein the first tool is further arranged for:
   moving the body part in a horizontal direction to a position above a receiving area, including a de-icing area or a receptacle or a receiving bin or a content receiving conveyor.

8. The system for opening a box according to claim 1, further comprising a cutting device for cutting straps located around a box.

9. The system for opening a box according to claim 1, wherein the body part and/or the lid comprises, consisting of a material with a density of less than 100 kg/m3, including polystyrene foam.

10. The system for opening a box according to claim 1, the system further comprising:
   a means for moving, including a conveyor for conveying, the box to the first tool and/or to the second tool.

11. The system for opening a box according to claim 10, wherein the means for moving is further arranged for moving a pallet with one or more boxes placed on the pallet.

12. The system for opening a box according to claim 1, the system further comprising:
   one or more sensors for detecting the box, including a detecting position and/or orientation.

13. The system for opening a box according to claim 1, wherein the system is further comprising:
   a user input interface for inputting information about one or more defect boxes and/or information about one or more boxes which should not have content removed,
   a processor arranged for receiving said information, and controlling the first tool and/or the second tool based on said information.

14. The system for opening a box according to claim 1, wherein the box comprises polystyrene foam and one or more food objects.

15. A method for opening a box having a body part and a lid, wherein the box contains one or more food items, and the body part and the lid are two separate units, said method comprising:
   attaching a first tool comprising an actuator to the body part;
   attaching a second tool comprising an actuator to a surface of the lid at one or more points of contact;
   applying at each of the one or more points of contact a pulling force to the lid having a component in a direction normal to the surface at the point of contact;
   orienting and/or displacing the lid with respect to the body part so as to open the box with the lid; and
   moving and/or orienting the body part to remove the one or more food items from said box by orienting the body part to allow gravity to remove the one or more food items from said box.

\* \* \* \* \*